United States Patent [19]

Blackwell et al.

[11] Patent Number: 4,994,514

[45] Date of Patent: Feb. 19, 1991

[54] ENCAPSULATION OF ELECTRONIC COMPONENTS WITH POLY(ARYLENE SULFIDE) CONTAINING MERCAPTOSILANE

[75] Inventors: Jennings P. Blackwell; John E. Leland; Robert D. Still; James S. Dix, all of Bartlesville, Okla.

[73] Assignee: Phillips Petroleum Company, Bartlesville, Okla.

[21] Appl. No.: 229,367

[22] Filed: Aug. 5, 1988

Related U.S. Application Data

[62] Division of Ser. No. 399,110, Jul. 16, 1982, Pat. No. 4,782,195.

[51] Int. Cl.$^5$ .................... C08K 3/36; C08K 3/40
[52] U.S. Cl. .................... 524/262; 524/423; 524/451; 524/609; 523/213
[58] Field of Search ............ 523/213, 214; 524/188, 524/261, 262, 265, 423, 430, 449, 451, 609

[56] References Cited

U.S. PATENT DOCUMENTS

| | | | |
|---|---|---|---|
| 3,123,495 | 3/1964 | Carpenter et al. | 117/72 |
| 3,297,473 | 1/1967 | Bulbenko | 117/72 |
| 3,312,669 | 4/1967 | Giordano | 260/79.1 |
| 3,577,346 | 5/1971 | McKeown | 252/63.5 |
| 3,702,356 | 11/1972 | Hall | 264/141 |
| 4,020,054 | 4/1977 | Fodor | 524/413 |
| 4,176,098 | 11/1979 | Needham | 260/18 R |
| 4,269,756 | 5/1981 | Su | 260/37 R |
| 4,337,182 | 6/1982 | Needham | 524/609 |
| 4,350,786 | 9/1982 | Blackwell et al. | 524/263 |
| 4,370,292 | 1/1983 | Yanase et al. | 264/272.11 |
| 4,434,263 | 2/1984 | Blackwell | 524/609 |
| 4,451,601 | 5/1984 | Blackwell | 524/263 |
| 4,514,588 | 4/1985 | Beever et al. | 524/261 |
| 4,528,310 | 7/1985 | Blackwell | 524/86 |
| 4,548,971 | 10/1985 | Martinovich et al. | 524/431 |
| 4,740,425 | 4/1988 | Leland et al. | 524/262 |
| 4,782,195 | 11/1988 | Blackwell et al. | 524/609 |

FOREIGN PATENT DOCUMENTS

| | | |
|---|---|---|
| 0044136 | 1/1982 | European Pat. Off. |
| 7612861 | 1/1976 | Japan |
| 5515634 | 2/1976 | Japan |
| 5252958 | 4/1977 | Japan |

Primary Examiner—John C. Bleutge
Assistant Examiner—David W. Woodward
Attorney, Agent, or Firm—Williams, Phillips & Umphlett

[57] ABSTRACT

Electronic components can be encapsulated with a poly(arylene sulfide) composition containing a mercaptosilane such as, for example, 3-mercaptopropyltrimethoxysilane.

20 Claims, 1 Drawing Sheet

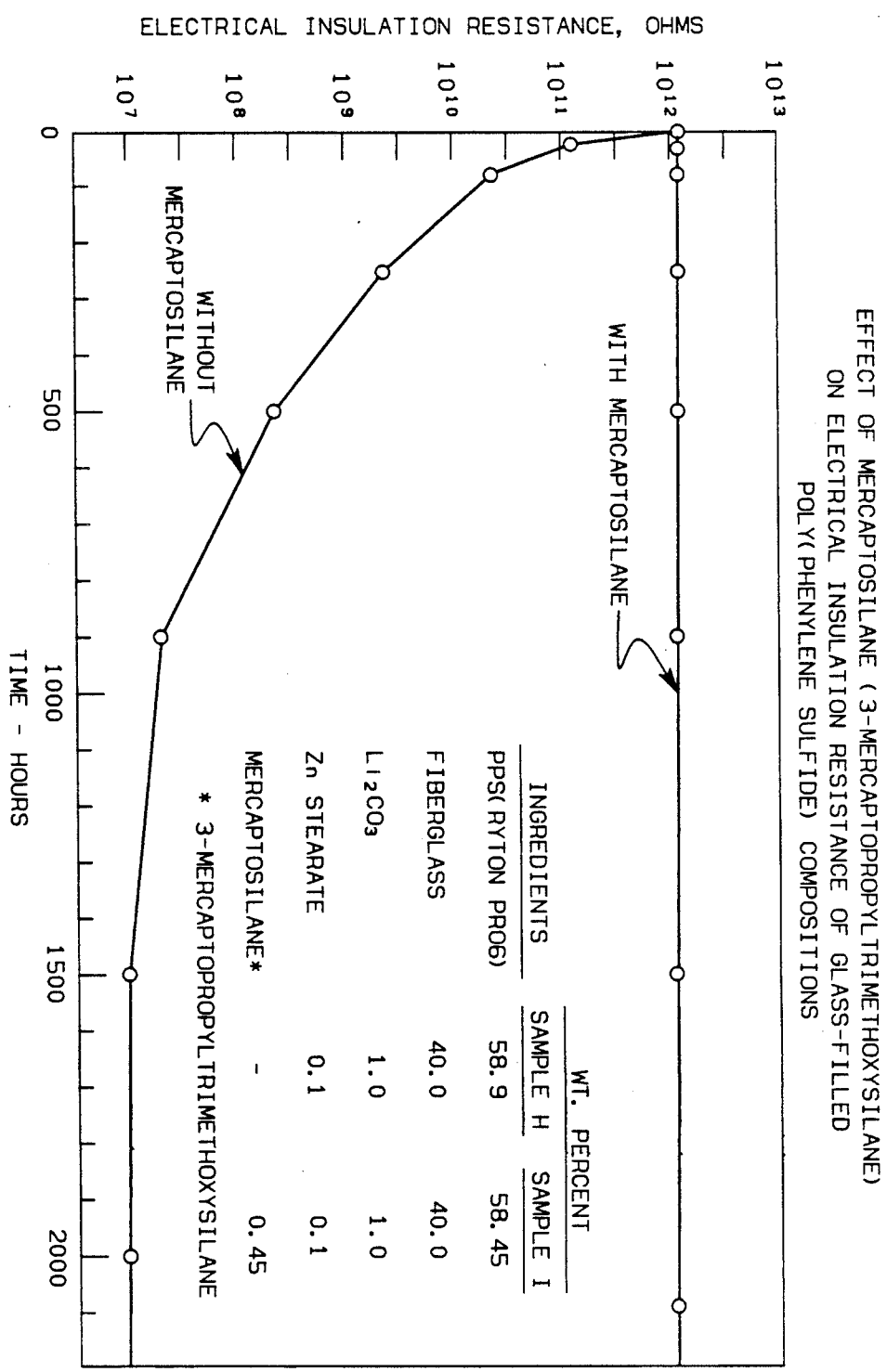

ENCAPSULATION OF ELECTRONIC COMPONENTS WITH POLY(ARYLENE SULFIDE) CONTAINING MERCAPTOSILANE

This application is a division of application Ser. No. 399,110, filed July 16, 1982, now U.S. Pat. No. 4,782,195.

This invention relates to poly(arylene sulfide) compositions. In another aspect this invention relates to the encapsulation of electronic components.

BACKGROUND

U.S. Pat. No. 4,337,182, incorporated by reference herein, describes a poly(arylene sulfide) composition suitable for encapsulating semi-conductors. The composition disclosed in that patent includes a small amount (about 0.5 to 3 weight percent) of an organic silane. The purpose of the organic silane, as taught by the patent, is to function as a coupling agent, to impart improved water resistance and to decrease the linear coefficient of expansion of the composition. The only organic silane species specifically identified are:
gamma-glycidoxypropyltrimethoxysilane
methyltrimethoxysilane
polyisoxymethoxysilane
vinyltris(2-methoxyethoxy)silane
beta-(3,4-epoxycyclohexyl)-ethyltrimethoxysilane
N-beta(N-vinylbenzylamine)ethyl gamma-aminopropyltrimethoxysilane monohydrogen chloride The patent further teaches that the last of these silanes is preferred. Another name for this preferred silane is N-{2-[3-(trimethoxysilyl)propylamino]ethyl}-p-vinylbenzylammonium chloride.

The Phillips Chemical Company (a division of Phillips Petroleum Company, Bartlesville, Oklahoma) has marketed an encapsulating composition containing this silane. The composition comprises:
(a) poly(phenylene sulfide),
(b) fiber glass,
(c) talc or silica, and
(d) N-{2-[3-(trimethoxysilyl)propylamino]ethyl}-p-vinylbenzylammonium chloride.

Electronic components are coated or encapsulated with this poly(phenylene sulfide) composition to maintain electrical insulation, to provide mechanical protection and to otherwise shield the component from exposure to its environment.

One very important property of any encapsulation material is electrical resistance. In use, the encapsulation material is generally subjected to a hostile environment that adversely affects the desired properties of the material. Of particular concern are the effects of high temperature conditions and/or of high humidity conditions. Such conditions can cause a decrease in the electrical resistance of the encapsulation material.

It is an objective of those of skill in the art of poly(arylene sulfide) encapsulation compositions to produce compositions which retain high electrical resistance when subjected to hostile conditions such as, for example, high temperature and high humidity. It is also an objective of those of skill in this art to produce poly(arylene sulfide) compositions of increased electrical resistance.

Another objective of those of skill in the art is to produce poly(arylene sulfide) compositions of decreased specific conductivity.

SUMMARY OF THE INVENTION

The electrical resistance of a poly(arylene sulfide) composition is increased by the presence of a mercaptosilane such as, for example, 3-mercaptopropyltrimethoxysilane. Also, the specific conductivity of the composition is decreased by the presence of the mercaptosilane.

Broadly, our invention encompasses the encapsulation of electronic components with a poly(arylene sulfide) composition, such as, for example, a poly(phenylene sulfide) composition, containing at least one mercaptosilane such as, for example, 3-mercaptopropyltrimethoxysilane. The mercaptosilane is defined to be, for the purposes of this invention, an organosilane having an —SH functional group.

Our invention includes, but is not limited to, poly(arylene sulfide) compositions containing, in addition to mercaptosilane, other components such as glass and talc or silica.

OBJECTS OF THE INVENTION

It is an object of our invention to increase the electrical resistance of a poly(arylene sulfide) composition.

It is a further object of this invention to decrease the specific conductivity of a poly(arylene sulfide) composition.

It is also an object of our invention to coat or encapsulate electronic components with an improved composition.

These objects and other objects and advantages will be apparent to a person of ordinary skill in the art from this disclosure and the appended claims.

DESCRIPTION OF THE DRAWING

FIG. 1 corresponds to Example VI and graphically illustrates the advantage of 3-mercaptopropyltrimethoxysilane in a poly(phenylene sulfide) composition.

DESCRIPTION OF THE INVENTION

1. Broad Description

Uncured or partially cured poly(arylene sulfide) whether homopolymer, copolymer, terpolymer, and the like, or a blend of such polymers, can be used in the practice of my invention. The uncured or partially cured polymer is a polymer the molecular weight of which can be increased by either lengthening of a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein.

Examples of poly(arylene sulfide) compositions suitable for purposes of my invention include poly(2,4-tolylene sulfide), poly(4,4'-biphenylene sulfide) and poly(phenylene sulfide). Because of its availability and desirable properties (such as high chemical resistance, non-flammability, and high strength and hardness) poly(phenylene sulfide) is the presently preferred poly(arylene sulfide). Accordingly, poly(phenylene sulfide) compositions are the preferred encapsulation compositions of my invention.

In accordance with the broad concept of my invention electronic components are encapsulated with a poly(arylene sulfide) composition (such as, for example, a poly(phenylene sulfide) composition) containing at least one mercaptosilane (such as, for example, 3-mercaptopropyltrimethoxysilane). The poly(arylene sulfide) composition can be, but is not required to be, a mixture of more than one poly(arylene sulfide). The poly(arylene sulfide) composition can contain, in addition to mercaptosilane, other components although the broad concept of our invention is not limited thereto.

Our invention also includes more detailed poly(arylene sulfide) compositions which are especially well suited for successful use as encapsulation compositions. These compositions are described later in this disclosure.

The preferred mercaptosilane is 3-mercaptopropyltrimethoxysilane or $HSCH_2CH_2CH_2Si(OCH_3)_3$. This silane is preferred because of its extraordinary utility as an encapsulation composition additive. 3-mercaptopropyltrimethoxysilane is especially effective in both increasing the electrical resistance of the compositions of our invention and decreasing the specific conductivity of these compositions.

The electronic components to be encapsulated in accordance with our invention broadly include all electronic components (i.e. devices, parts, etc.) for which encapsulation is desired. The term electronic component is intended to be broadly construed and includes, by way of non-limiting example, the following:
capacitors
resistors
resistor networks
integrated circuits
transistors
diodes
triodes
thyristors
coils
varistors
connectors
condensers
transducers
crystal oscillators
fuses
rectifiers
power supplies
microswitches The definition of each of the above-identified electronic components is similarly intended to be broad and comprehensive. The term integrated circuit, for example, is intended to include, but is not limited to
large scale integrated circuits,
TTL (transistor transit logic),
hybrid integrated circuits,
linear amplifiers,
operational amplifiers,
instrumentation amplifiers,
isolation amplifiers,
multipliers and dividers,
log/antilog amplifiers,
RMS-to-DC converters,
voltage references,
transducers,
conditioners,
instrumentation,
digital-to-analog converters,
analog-to-digital converters,
voltage/frequency converters,
synchro-digital converters,
sample/track-hold amplifiers,
CMOS switches and multiplexers,
data-acquisition subsystems,
power supplies,
memory integrated circuits,
microprocessors,
and so on.

Although our invention is not limited thereto, the composition can also contain other ingredients such as reinforcing agents and fillers.

The reinforcing agent can be, for example, glass. Fiber glass is preferred because in this form (i.e. high ratio of length to diameter) the reinforcement utility of the glass is optimized. Other forms of glass such as, for example, powder, grain and beads are, non-the-less, within the scope of our invention. Examples of other suitable reinforcing agents include, by way of nonlimiting example, asbestos fibers and ceramic fibers (e.g. aromatic polyamide fibers).

Fillers can be used to improve the dimensional stability, thermal conductivity and mechanical strength of the composition. Suitable fillers include, for example, talc, silica, clay, alumina, calcium sulfate, calcium carbonate, mica and so on. The fillers can be in the form of, for example, powder, grain or fiber. In selecting a filler the following factors should be considered:

(1) the electrical conductivity of the filler (the lower the better);
(2) tendency of the filler to decompose at encapsulation temperatures; and
(3) the level of ionic impurities in the filler.

Besides reinforcing agents and fillers the compositions of our invention can optionally contain relatively small amounts of other ingredients such as, for example, pigments and processing aids.

It should be noted that the first list of encapsulation components includes both active components (such as, for example, integrated circuits, transistors and diodes) and passive components (such as, for example, capacitors, resistors and resistor networks). The distinction is frequently important and is often determinative of the type of poly(arylene sulfide) encapsulation composition best suited for encapsulation of the component.

These more detailed poly(arylene sulfide) compositions, which are especially well suited for successful use as encapsulation compositions, broadly comprise the following:
(a) poly(arylene sulfide),
(b) glass,
(c) filler, and
(d) mercaptosilane.

These compositions can optionally contain, in addition to (a), (b), (c) and (d) above, relatively small amounts of other components such as, for example, pigments and processing aids.

2. Compositions for the Encapsulation of Active Components

Compositions used for the encapsulation of active components can be prepared in accordance with the following weight percentages:

(a) Poly(arylene sulfide)
   about 25 to about 45 wt % broad range
   about 32 to about 38 wt % preferred range
      about 35 wt % target
(b) Glass
   about 5 to about 30 wt % broad range
   about 10 to about 20 wt % preferred range
      about 15 wt % target
(c) Filler
   about 40 to about 60 wt % broad range -continued > about 45 to about 55 wt % preferred range
> about 49 wt % target
> (d) Mercaptosilane
> up to about 4 wt % broad range
> about .4 to about 1.5 wt % preferred range
> about 1 wt % target The above weight percentages are based upon the total amount of (a), (b), (c) and (d) in the composition.

The broad ranges represent the ranges within which the composition should be confined in order to obtain good results. The preferred ranges are preferred because they define a composition possessing the physical, chemical and electrical properties best suited for its intended encapsulation purposes. The target weight percentages represent the presently contemplated best mode.

Although our invention is not limited thereto the viscosity of the composition used for encapsulation of active components should not exceed about 800 poise (as tested on a capillary rheometer at 650° F. and at a shear rate of 1000 (sec)$^{-1}$). Encapsulation of active electronic components with compositions having viscosities in excess of about 800 poise can cause damage to the components. It is contemplated that the viscosity of the composition will generally range from about 150 to about 500 poise for active components other than very delicate components such as, for example, integrated circuits with wire leads. With respect to very delicate components such as, for example integrated circuits with wire leads the viscosity of the encapsulation composition should be below about 150 poise (as tested on a capillary rheometer at 650° F. and at a shear rate of 1000 (sec)$^{-1}$). Encapsulation of integrated circuits with compositions any higher in viscosity can cause wire wash (i.e., breaking of the wires of the integrated circuit). It is contemplated that the viscosity of the composition for the encapsulation of such integrated circuits and the like will generally range from about 75 to about 150 poise.

Although viscosity of the composition depends on a number of factors, to obtain composition viscosities below about 800 poise the viscosity of the poly(arylene sulfide) should generally not exceed about 130 poise (as tested on a capillary rheometer at 650° F. and at a shear rate of 1000 (sec)$^{-1}$). It is contemplated that the viscosity of the poly(arylene sulfide) will, in most applications, range up to about 70 poise. To obtain composition viscosities within the desired range for delicate active components such as, for example, integrated circuits with wire leads the viscosity of the poly(arylene sulfide) should generally be less than about 25 poise (as tested on a capillary rheometer at 650° F. and at a shear rate of 1000 (sec)$^{-1}$).

The purity of the composition can be measured in terms of specific conductivity of the composition. For good results the composition should be sufficiently pure such that the specific conductivity of the composition, as measured in Example V, does not exceed about 50 μs/cm. We recommend that the specific conductivity of the composition be maintained below about 20 μs/cm.

The filler is preferably silica. The silica can be amorphous silica or crystalline silica. Silica is commercially available as a finely ground material having a relatively narrow particle size distribution ranging from about 1 to about 100 micrometers. Such commercial silica is typically made up of about 99.5 weight percent $SiO_2$ with $Al_2O_3$, $Fe_2O_3$, $Na_2O$ and $K_2O$ as the remaining components.

The preferred encapsulation composition for active components is prepared from:

(a) about 32 to about 38 wt % poly(phenylene sulfide) (viscosity less than about 130 poise as tested on a capillary rheometer at 650° F. and at a shear rate of about 1000 (sec)$^{-1}$),
(b) about 10 to about 20 wt % fiber glass,
(c) about 45 to about 55 wt % amorphous silica, and
(d) about 0.4 to about 1.5 wt % 3-mercaptopropyltrimethoxysilane.

If the viscosity of the poly(phenylene sulfide) is below about 25 poise (as tested on a capillary rheometer at 650° F. and at a shear rate of 1000 (sec)$^{-1}$) this composition is especially well suited for the encapsulation of integrated circuits with wire leads. Accordingly, integrated circuits with wire leads, encapsulated with this composition, represent one embodiment of our invention.

3. Compositions for the Encapsulation of Passive Components

Compositions used for the encapsulation of passive components can be prepared in accordance with the following weight percentages:

> (a) Poly(arylene sulfide)
> about 25 to about 45 wt % broad range
> about 32 to about 38 wt % preferred range
> about 35 wt % target
> (b) Glass
> about 20 to about 50 wt % broad range
> about 25 to about 45 wt % preferred range
> about 35 wt % target
> (c) Filler
> about 18 to about 38 wt % broad range
> about 23 to about 33 wt % preferred range
> about 28 wt % target
> (d) Mercaptosilane
> up to about 4 wt %
> about .4 to about 1.5 wt % preferred range
> about 1 wt % target The above weight percentages are based upon the total amount of (a), (b), (c) and (d) in the composition.

The broad ranges represent the ranges within which the composition should be confined in order to obtain good results. The preferred ranges are preferred because they define a composition possessing the physical, chemical and electrical properties best suited for its intended encapsulation purposes. The target weight percentages represent the presently contemplated best mode.

Although our invention is not limited thereto the viscosity of the composition used for encapsulation of passive components should not exceed about 1200 poise (as tested on a capillary rheometer at 650° F. and at a shear rate of 1000 (sec)$^{-1}$). Encapsulation of passive electronic components with compositions having viscosities in excess of about 1200 poise can cause damage to the components. It is contemplated that the viscosity of the composition will generally range from about 500 to about 800 poise.

To obtain composition viscosities within the desired ranges the viscosity of the poly(arylene sulfide) should not exceed about 300 poise (as tested on a capillary rheometer at 650° F. and at a shear rate of 1000 (sec)$^{-1}$). It is contemplated that the viscosity of the poly(arylene sulfide) will generally range from about 190 to about 300 poise.

The preferred filler is talc because of its availability and ability to improve the dimensional stability, thermal conductivity and mechanical strength of the composition. In place of talc, or in combination with talc, other fillers can be used. Examples of such suitable fillers include, silica, calcium sulfate, calcium carbonate, clay and mica. Calcium sulfate is especially useful in compositions used to encapsulate connectors.

The preferred encapsulation composition for passive components is prepared from:

(a) about 32 to about 38 wt % poly(phenylene sulfide) (viscosity less than about 300 poise as tested on a capillary rheometer at 650° F. and at a shear rate of about 1000 $(sec)^{-1}$),
(b) about 25 to about 45 wt % fiber glass,
(c) about 23 to about 33 wt % talc, and
(d) about 0.4 to about 1.5 wt % 3-mercaptopropyltrimethoxysilane.

This composition is especially well suited for the encapsulation of capacitors. Accordingly, capacitors, encapsulated with this composition, represent an embodiment of our invention.

4. How to Make

The compositions of this invention can be made in accordance with any method wherein the poly(arylene sulfide), glass, filler and mercaptosilane are combined to form a mixture. Many suitable methods are well known to those of skill in the art. By way of example, the components of the composition can be mixed together at room temperature in a rotating drum blender or in an intensive mixer such as a Henschel mixer and then extrusion compounded at a temperature above about the melting point of the poly(arylene sulfide) to produce a uniform blend.

Once made, the composition can be used to encapsulate electronic components in accordance with any encapsulation method suitable for thermoplastic encapsulation compositions. Such methods are well known in the art. The composition can, for example, be introduced into an injection molding apparatus to produce a melt which is extruded into an injection mold wherein the electronic component to he encapsulated is positioned. Transfer molding processes are also acceptable.

The following examples are presented to facilitate disclosure of our invention and should not be interpreted to unduly limit the scope of our invention.

EXAMPLE I

The following components were intimately mixed for about 10 to 15 minutes in a tumbler type mixer:

| | | |
|---|---|---|
| poly(phenylene sulfide) | 700 grams | 34.6 wt % |
| .125 inch milled glass | 700 grams | 34.6 wt % |
| talc | 600 grams | 29.7 wt % |
| zinc stearate | 2 grams | 0.1 wt % |
| lithium carbonate | 20 grams | 1.0 wt % |

The viscosity of the poly(phenylene sulfide) was 200 poise as tested by a capillary rheometer (Sieglaff McKelvey) at 650° F. and at a shear rate of 1000 $(sec)^{-1}$. The zinc stearate is an internal molding lubricant. The lithium carbonate is a mold corrosion inhibitor.

The mixture was extruded through a Davis Standard extruder at 600° F. (316° C.), ground to a granular or coarse powder and dried in an oven at 350° F. (177° C.) for 3 hours. Some of the dried material was molded into bar specimens 8 inches×1 inch×0.125 inch using a New Britain molding machine (barrel 600° F., mold 275° F.). Some of the remaining material was molded into a flat disc, 2.5 inches in diameter ×0.125 inch thick, using a press mold (at 275° F. and about 6000 psi).

Three of the bars were immersed into distilled water in a pressure cooker at 120° C. and 15 psig for a total of 150 hours. The bars were then cooled, dried in an oven for a few hours at 110° C., and conditioned overnight at room temperature. Another set of 3 bars did not undergo this water boil treatment. Tensile strengths of the bars were determined in accordance with ASTM D 882-56T. The average tensile strength of the bars subjected to the water boil treatment was 59.4 MPa. The average tensile strength of the bars not subjected to the water boil treatment was 77.2 MPa. The results indicate a percent loss value of 23.0 due to the water boil treatment.

The flat disc was used to determine the electrical insulation resistance of the composition. Three holes, each 0.25 in. in diameter and located in a triangular pattern about 1.25 in. apart, were drilled in the disc. A metal bolt (with nut and washer) was attached through each hole. A single tinned copper wire was attached to each bolt. The wired disc was conditioned for 48 hours in a 95±1% relative humidity chamber at 90° C. After the 48 hour exposure the resistance between each pair of leads at a potential of 500 volts was measured using a Gen Rad Megohmeter (type 1862-C) havIng the capability to measure resistance up to $2\times10^{12}$ ohm. For each pair of leads two measurements were made, i.e. a first measurement and a second measurement about 1 minute after the first. After all three pairs of leads had been measured the average value of the first measurements was calculated and the average value of the second measurements was calculated. The average electrical insulation resistance was $9.9\times10^8$ ohms for the first measurements and $9.5\times10^8$ ohms for the second measurements.

EXAMPLE II

The preparation and test procedures of Example I were repeated with the exception that 13.5 grams of 3-mercaptopropyltrimethoxysilane (Z6062 from Dow Corning) was premixed with the talc before tumble mixing with the other components of the composition.

The average tensile strength of the bars subjected to the water boil treatment was 65.6 MPa. The average tensile strength of the bars not subjected to the water boil treatment was 81.4 MPa. The results indicate a percent loss value of 19.4 due to the water boil treatment.

The average electrical insulation resistance was greater than $2\times10^{12}$ ohm for both the first and second measurements. As noted earlier the Gen Rad Megohmeter was unable to measure resistance above $2\times10^{12}$ ohm.

The results indicate that the presence of the mercaptosilane significantly increased the electric resistance of the composition without a loss in tensile strength (in fact tensile strength was improved). Results are presented in Table I below.

TABLE I

| Properties | Example I (No Silane) | Example II (Mercaptosilane) |
|---|---|---|
| 1. Tensile Strength (MPa) | | |
| a. without water boil treatment | 77.2 | 81.4 |
| b. with water boil treatment | 59.4 | 65.6 |
| c. percent loss | 23.0% | 19.4% |
| 2. Electrical Resistance (ohms) | | |
| a. average first measurement | $9.9 \times 10^8$ | $>2 \times 10^{12}$ |
| b. average second measurement | $9.5 \times 10^8$ | $>2 \times 10^{12}$ |

EXAMPLE III

The preparation and test procedures of Examples I and II were repeated except that 600 grams of calcium carbonate was used in place of the talc and, in the second run, 16 grams of 3-mercaptopropyltrimethoxysilane (A-189 from Union Carbide) was used as the mercaptosilane.

The results, presented in Table II below, again show the significant utility of a small amount of the mercaptosilane.

TABLE II

| Properties | (No Silane) | With (Mercaptosilane) |
|---|---|---|
| 1. Tensile Strength (MPa) | | |
| a. without water boil treatment | 50.6 | 57.3 |
| b. with water boil treatment | 47.5 | 55.0 |
| c. percent loss | 6.1 | 4.0 |
| 2. Electrical Resistance (ohms) | | |
| a. average first measurement | $7.3 \times 10^6$ | $>2 \times 10^{12}$ |
| b. average second measurement | $7.0 \times 10^6$ | $>2 \times 10^{12}$ |

EXAMPLE IV

The preparation and test procedures of Examples I and II were repeated with the compositions indicated below:

| | |
|---|---|
| poly(phenylene sulfide) | 682 grams |
| glass fibers | 682 grams |
| talc | 589 grams |
| ethylene bis stearamide | 20 grams |
| polyethylene | 5 grams |
| pigment | 9 grams |
| silane | X grams |

Composition A: X = 0 gram
Composition B: X = 13.2 grams of a 40% methanol solution of N-{2-[3-(trimethoxysilyl)propylamino]ethyl}-p-vinylbenzylammonium chloride.
$CH_2=CH-$ 0 $-CH_2NH_2CH_2CH_2NH(CH_2)_3 Si(OCH_3)_3Cl$ (Z6032 from Dow Corning Corp.)
Composition C: X = 5.3 grams of 3-mercaptopropyltrimethoxysilane (A-189 from Union Carbide)
Composition D: X = 9 grams of 3-mercaptopropyltrimethoxysilane (A-189 from Union Carbide)

The ethylene bis stearamide is a flow improver. The polyethylene is an internal lubricant.

The results, presented in Table III below, demonstrate the marked superiority of the mercaptosilane over not only the control (no silane—composition A) but also the silane (composition B) preferred in the prior art. Note that the electrical insulation resistance of composition C is greater than the electrical insulation resistance of composition B by nearly a factor of 10.

TABLE III

| Properties | A | B | C | D |
|---|---|---|---|---|
| | | Composition | | |
| 1. Tensile Strength (MPa) | | | | |
| a. without water boil treatment | 62.0 | 50.9 | 53.1 | 52.0 |
| b. with water boil treatment | 31.8 | 51.0 | 49.7 | 47.1 |
| c. percent loss | 48.7 | 0 | 6.4 | 9.4 |
| 2. Electrical Insulation Resistance | | | | |
| a. average first measurement | $2.2 \times 10^7$ | $3.3 \times 10^{10}$ | $2.2 \times 10^{11}$ | $>2 \times 10^{12}$ |
| b. average second measurement | $1.9 \times 10^7$ | $3.2 \times 10^{10}$ | $2.3 \times 10^{11}$ | $>2 \times 10^{12}$ |

EXAMPLE V

The compositions of this example were as follows:

| Composition: weight percent | E | F | G |
|---|---|---|---|
| poly(phenylene sulfide) | 34 | 34 | 34 |
| fiber glass | 15 | 15 | 15 |
| silica | 49 | 48.2 | 48.2 |
| ethylene bis stearamide | 1 | 1 | 1 |
| black pigment | 1 | 1 | 1 |
| silane Z-6032 | — | .8 | — |
| silane A-189 | — | — | .8 |

The poly(phenylene sulfide) was uncured Ryton ™ V-1 (Phillips Petroleum Co.) having a flow rate of about 3,000 to 8,000 grams/10 min. as determined in accordance with test method ASTM D 1238, Procedure B modified to use a 5 kg wt, 600° F. and a 0.0825 inch orifice). The fiber glass was chopped ⅛ inch fiber glass.

Silane Z-6032 (Dow Corning Corp.) was a 40 wt % methyl alcohol solution of N-{2-[3-(trimethoxysilyl)-propylamino]ethyl}p-vinylbenzylammonium chloride. Silane A-189 (Union Carbide) was 3-mercaptopropyltrimethoxysilane.

Each composition was prepared by charging the ingredients to a Henschel mixer where they were mixed until completely dispersed. The mixture was passed through a Buss-Condux cokneader extruder at 570°-600° F. and pelletized. The pelletized compounded product was then injection molded into 1/16 inch×2.5 inch square plaques using a 35 ton Arburg molding machine (650° F. stock temperature, 275° F. mold temperature). Three 0.191 inch diameter holes were drilled in the plaques in a triangular pattern with mutual spacing of 1.25 inches between centers. The plaques were tested for electrical insulation resistance as described in Example I.

Specific conductivity of the compositions was also measured. The procedure for each of the pelletized compositions was as follows. The composition was ground to a coarse powder in a Willey Mill #3383-L60 fitted with a No. 40 ASTM screen. The ground material was sieved using No. 40 and No. 60 screens. The material caught on the No. 60 screen was collected. A weighed sample (0.600±0.001 grams) was put into a 100 milliliter round-bottom glass flask equipped with a Friedrich condenser and electric heating mantle. Sixty milliliters of a 0.03 wt % aqueous solution of Triton X-100 (a non-ionic surfactant ethoxylated nonyl phenol) was poured into the flask. The mixture was refluxed for 1.5 hours, cooled and filtered through a Teflon filter paper (Millipore, 25 mm, 5.0 μm No. LSWP 02500). A control sample (aqueous Triton X-100 solution only) was similarly refluxed, cooled and filtered.

The specific conductivity of the filtrate was measured using a model 252 Impedance Meter from Electro Scientific Industries. The conductivity probe was a Balsbaugh probe having a constant of 0.01 $(cm)^{-1}$. Specific conductivity was calculated by subtracting the conductivity of the blank (i.e. the control sample) from the conductivity of the composition-containing sample.

The results are presented in Table IV below:

TABLE IV

| Tests | Compositions | | |
|---|---|---|---|
| | E | F | G |
| 1. Electrical Insulation Resistance, ohms (Average of the second measurements) | $6.4 \times 10^5$ | $9 \times 10^8$ | $4.2 \times 10^{11}$ |
| 2. Specific Conductivity (μs/cm) 1.5 hrs | 10.4 | 10.4 | 5.2 |

Composition G, containing the mercaptosilane had both the highest resistance and the lowest specific conductivity.

Composition G is an example of a material well suited for the encapsulation of an integrated circuit.

EXAMPLE VI

This example illustrates the effectiveness of the mercaptosilane, 3-mercaptopropyltrimethoxysilane (A-189), in enhancing electrical insulation resistance of glass filled poly(phenylene sulfide) compositions that have been exposed to high relative humidity and temperature. The test samples H and I were prepared in a manner similar to the samples of Example V. Only Sample I contained a mercaptosilane. Both samples were repeatedly tested at different time intervals for electrical insulation resistance in the manner previously described. The results are graphically represented in FIG. 1 and show the effectiveness of the mercaptosilane in maintaining good electrical insulation resistance properties after exposure to heat and high relative humidity. The data show that without the mercaptosilane present resistance was greatly reduced while with the mercaptosilane resistance was greater than $2 \times 10^{11}$ at all times.

We claim:

1. A composition for encapsulating an active electronic component comprising:
    (i) about 25 to about 45 weight percent poly(arylene sulfide),
    (ii) mercaptosilane,
    (iii) about 5 to about 30 weight percent glass,
    (iv) about 40 to about 60 weight percent silica; wherein said weight percentages are based upon total amount of (i), (ii), (iii) and (iv); and wherein the viscosity of said composition does not exceed about 800 poise as tested on a capillary rheometer at 650° F. and at a shear rate of 1000 $(sec)^{-1}$.

2. A composition in accordance with claim 1 wherein the weight percentage of mercaptosilane does not exceed about 4 weight percent based upon total amount of (i), (ii), (iii) and (iv).

3. A composition in accordance with claim 2 wherein the specific conductivity of the composition as measured in Example V is less than about 50 μs/cm.

4. A composition in accordance with claim 3 wherein said glass is fiber glass.

5. A composition in accordance with claim 1, 2 or 3 wherein (ii) is 3-mercaptopropyltrimethoxysilane.

6. A composition in accordance with claim 1, 2 or 3 wherein (i) is poly(phenylene sulfide).

7. A composition in accordance with claim 5 wherein (i) is poly(phenylene sulfide).

8. A composition in accordance with claim 1 wherein
    (i) is about 32 to about 38 weight percent poly(phenylene sulfide),
    (ii) is about 0.4 to about 1.5 weight percent 3-mercaptopropyltrimethoxysilane,
    (iii) is about 10 to about 20 weight percent fiber glass, and
    (iv) is about 45 to about 55 weight percent silica; wherein said weight percentages are based on the total amount of (i), (ii), (iii), and (iv).

9. A composition in accordance with claim 8 wherein said viscosity of said composition does not exceed about 150 poise.

10. A composition for encapsulating passive electronic components comprising:
    (i) about 25 to about 45 weight percent poly(arylene sulfide),
    (ii) mercaptosilane,
    (iii) about 20 to about 50 weight percent glass, and
    (iv) about 18 to about 38 weight percent silica; wherein said weight percentages are based upon total amount of (i), (ii), (iii), and (iv); and wherein the viscosity of said composition does not exceed about 1200 poise as tested on a capillary rheometer at 650° F. and at a shear rate of 1000 $(sec)^{-1}$.

11. A composition in accordance with claim 10 wherein the weight percentage of said mercaptosilane does not exceed about 4 weight percent based upon total amount of (i), (ii), (iii) and (iv).

12. A composition in accordance with claim 10 or 11 wherein (ii) is 3-mercaptopropyltrimethoxysilane.

13. A composition in accordance with claim 10 or 11 wherein (i) is poly(phenylene sulfide.

14. A composition in accordance with claim 12 wherein (i) is poly(phenylene sulfide).

15. A composition in accordance with claim 10 wherein
    (i) is about 32 to about 38 weight percent poly(phenylene sulfide),
    (ii) is about 0.4 to about 1.5 weight percent 3-mercaptopropyltrimethoxysilane,
    (iii) is about 25 to about 45 weight percent fiber glass, and
    (iv) is about 23 to about 33 weight percent silica; wherein said weight percentages are based on the total amount of (i), (ii), (iii) and (iv).

16. A composition in accordance with claim 15 wherein said viscosity ranges from about 500 to about 800 poise.

17. A composition for encapsulating an active electronic component consisting essentially of:
    (i) about 25 to about 45 weight percent poly(arylene sulfide), (ii) mercaptosilane,
(iii) about 5 to about 30 weight percent glass,
(iv) about 40 to about 60 weight percent silica; wherein said weight percentages are based upon total amount of (i), (ii), (iii) and (iv); and wherein the viscosity of said composition does not exceed about 800 poise as tested on a capillary rheometer at 650° F. and at a shear rate of 1000 $(\text{sec})^{-1}$.

18. A composition for encapsulating passive electronic components consisting essentially of:
(i) about 25 to about 45 weight percent poly(arylene sulfide),
(ii) mercaptosilane,
(iii) about 20 to about 50 weight percent glass, and
(iv) about 18 to about 38 weight percent silica; wherein said weight percentages are based on the total amount of (i), (ii), (iii) and (iv); and wherein the viscosity of said composition does not exceed about 1200 poise as tested on a capillary rheometer at 650° F. and at a shear rate of 1000 $(\text{sec})^{-1}$.

19. A composition as recited in claim 17 wherein said poly(arylene sulfide) is uncured poly(phenylene sulfide) having a flow rate of about 3,000 to 8,000 grams/10 minutes.

20. A composition as recited in claim 18 wherein said poly(arylene sulfide) is uncured poly(phenylene sulfide) having a flow rate of about 3,000 to about 8,000 grams/10 minutes.

* * * * *